(12) United States Patent
Braun et al.

(10) Patent No.: US 8,049,606 B2
(45) Date of Patent: Nov. 1, 2011

(54) METHOD FOR ASSIGNING IDENTIFICATION CODES IN RADIO SIGNALS FROM TIRE PRESSURE MONITORING DEVICES ON VEHICLE WHEELS TO THE WHEEL POSITION AND VEHICLE EQUIPPED FOR THIS METHOD

(75) Inventors: Mark Braun, Bretten (DE); Ulrich Haefele, Oberderdingen (DE); Thomas Kienzle, Besigheim (DE)

(73) Assignee: BERU Aktiengesellschaft, Ludwigsburg (DE)

( * ) Notice: Subject to any disclaimer, the term of this patent is extended or adjusted under 35 U.S.C. 154(b) by 606 days.

(21) Appl. No.: 11/985,938

(22) Filed: Nov. 19, 2007

(65) Prior Publication Data

US 2008/0129479 A1    Jun. 5, 2008

(30) Foreign Application Priority Data

Nov. 23, 2006   (DE) ......................... 10 2006 055 878

(51) Int. Cl.
*B60C 23/00*     (2006.01)
(52) U.S. Cl. ........................ 340/447; 73/146; 367/117
(58) Field of Classification Search .................. 340/442, 340/447, 426.33; 73/146, 146.2; 367/13, 367/117

See application file for complete search history.

(56) References Cited

U.S. PATENT DOCUMENTS

| | | | | |
|---|---|---|---|---|
| 4,887,067 A | * | 12/1989 | Reinecke | 340/442 |
| 5,463,374 A | * | 10/1995 | Mendez et al. | 340/442 |
| 5,813,441 A | | 9/1998 | Dewispelaere | |
| 5,819,813 A | | 10/1998 | Dewispelaere | |
| 5,880,363 A | * | 3/1999 | Meyer et al. | 73/146.5 |
| 6,018,993 A | * | 2/2000 | Normann et al. | 73/146.5 |
| 6,446,023 B1 | * | 9/2002 | Ernst | 702/138 |
| 6,581,164 B1 | * | 6/2003 | Felts et al. | 713/400 |
| 6,681,164 B2 | * | 1/2004 | Bergerhoff et al. | 701/36 |
| 6,710,708 B2 | | 3/2004 | McClelland | |

(Continued)

FOREIGN PATENT DOCUMENTS

DE      10355897 A1    6/2005

(Continued)

OTHER PUBLICATIONS

ATZ/MTZ Special Edition "System Partners" "The Tire System TSS".

(Continued)

*Primary Examiner* — George Bugg
*Assistant Examiner* — Edny Labbees

(57) ABSTRACT

A method for the assigning of identification codes that are sent in radio signals by tire pressure monitoring devices at the wheels of a vehicle and that are received by a receiver provided in or at the vehicle, which signals are relayed to an evaluation unit connected to the receiver, in which unit is stored a specific identification code for every wheel position of the vehicle and wherein the stored identification codes are compared with identification codes in subsequently sent radio signals, whereby for the storage of the identification code of the tire pressure monitoring device of a chosen wheel the specific wheel position intended for the chosen wheel is entered at a control unit, whis is in communication connection with the evaluation unit, subsequently the tire pressure monitoring device of the chosen wheel is caused to send a radio signal containing its identification code, this radio signal is received and the therein contained identification code is stored in the evaluation unit or in the control unit at a memory location assigned to the specific wheel position.

17 Claims, 1 Drawing Sheet

U.S. PATENT DOCUMENTS

| | | |
|---|---|---|
| 6,906,624 B2 | 6/2005 | McClelland |
| 7,088,226 B2 | 8/2006 | McClelland |
| 2002/0003474 A1 | 1/2002 | McClelland |
| 2004/0183664 A1 | 9/2004 | McClelland |
| 2004/0183665 A1 | 9/2004 | McClelland |
| 2006/0055524 A1* | 3/2006 | Okubo ......................... 340/445 |
| 2006/0139157 A1* | 6/2006 | Takao et al. ................... 340/442 |
| 2008/0143507 A1* | 6/2008 | Cotton et al. ................ 340/445 |

FOREIGN PATENT DOCUMENTS

| | | |
|---|---|---|
| EP | 0801160 A1 | 10/1997 |
| EP | 1026013 A1 | 8/2000 |
| WO | WO 2005/051683 A1 | 6/2005 |

OTHER PUBLICATIONS

Brochure "Schrader Reifendruckkontrollsystem".

\* cited by examiner

METHOD FOR ASSIGNING IDENTIFICATION CODES IN RADIO SIGNALS FROM TIRE PRESSURE MONITORING DEVICES ON VEHICLE WHEELS TO THE WHEEL POSITION AND VEHICLE EQUIPPED FOR THIS METHOD

The invention relates to a method and pressure monitoring system.

Tire pressure monitoring systems are known, in which a battery-operated device for tire pressure monitoring is provided at the wheel, preferable underneath the tire. The device measures pressure and temperature of air in the tire and sends the measured values via radio signals to a receiver installed either at or in the vehicle. The receiver is connected to an evaluation unit that analyzes the radio signals and is equipped to notify the driver, whenever it is required to correct the air pressure. For enabling the driver to know which of the wheels is subject of such a notification, the evaluation unit must recognize from which wheel the radio signal originates. Thus, the tire pressure monitoring devices send along with the radio signal an identification code, which is characteristic for the specific tire pressure monitoring device. The evaluation unit compares the identification code sent by the tire pressure monitoring device with a series of identification codes that are stored in the evaluation unit, assigned to the vehicle's various tire positions.

EP 0 801 160 B1 discloses a method for the automatic recognition of identification codes of tire pressure monitoring devices installed on the wheels of a vehicle. This procedure is appropriate for passenger cars but less for commercial vehicles and it is especially unsuited for commercial vehicles with twin wheels. In the case of twin wheels it is difficult to differentiate from which of the tires of the twin wheels a signal originates.

In order to remedy this disadvantage, it is known to call-up a menu in an evaluation unit connected to the control unit in which menu identification codes can be assigned to the present wheel positions, and to enter the position of a wheel, for which an identification code is to be stored. Thereafter, the tire pressure monitoring device of this wheel is caused to transmit a signal by deflating the respective tire until the air pressure falls below a threshold value, whereupon the tire pressure monitoring device sends a radio signal. Because of the previously chosen allocation, the identification code sent with the radio signal is stored after its reception in the evaluation unit with the chosen allocation. This method is applied in a tire pressure monitoring device that is described in the 2003 Special Edition of the ATZ/MTZ Special Edition System Partners with the title "The Tire Safety System TSS, now also for Commercial Vehicles". The method is involved and time-consuming.

The brochure "Schrader Reifendruckkontrollsystem" [Schrader Tire Pressure Monitoring System] PU-088-D-1, published by TECMA GmbH, 56070 Koblenz, discloses a programming unit for the activating and new programming of valves that are provided with a tire pressure monitoring device. The programming unit is to be connected to a diagnostic interface of the vehicle and to the ignition of the vehicle. Then the vehicle manufacturer and the type of vehicle are elected. Thereupon, the display of the programming unit shows a top view of a graphic representation of the vehicle with four wheels and a spare wheel. The wheel positions are successively elected by actuating the programming unit. By means of a trigger transmitter at the chosen wheel, the tire pressure monitoring device installed at the chosen wheel is activated after the selection, whereupon the device sends a radio signal which, in addition to the pressure information also contains the identification code of the tire pressure monitoring device. The radio signal is received by a receiver in the vehicle and stored in an evaluation unit connected to the receiver.

This known programming unit is designed for a workshop operation, namely for the case of a wheel change for passenger cars. It would be too expensive to have it in every vehicle. Furthermore, it is unsuited for commercial vehicles with twin wheels because one cannot selectively activate the tire pressure monitoring device for only one of the twin wheels. Rather, in order to be able to reliably effectuate the storage of the identification codes, at least one of the two twin wheels must be dismounted and because of the limited range of the radio signals of the tire pressure monitoring device it cannot be removed too far from the vehicle's receiver or from its receiving antenna, respectively, because otherwise the radio signal sent by the trigger unit could not be received in a reliable manner.

SUMMARY OF THE INVENTION

An object of the present invention is to show a manner in which a tire pressure monitoring system can be improved to such an extent that also in the case of commercial vehicles with twin wheels the identification codes of the tire pressure monitoring devices of the various wheels can be stored in a reliable manner in the evaluation unit of the tire pressure monitoring device but with a minimum of technical requirement and time consumption.

This object is solved by a method comprising the features set forth in claim 1. Claim 12 refers to a vehicle that is equipped in such manner that a method according to claim 1 can be performed at it. Other advantageous embodiments are subject of the dependent claims.

According to the invention, the tire pressure monitoring device of a chosen wheel of a vehicle which is equipped with a trigger transmitter for this specific purpose is caused to send a radio signal containing its identification code by bringing the chosen wheel, prior to its mounting at its predetermined wheel position, close to the trigger transmitter which activates the tire pressure monitoring device of the chosen wheel by triggering. Then the wheel is mounted at its predetermined wheel position.

This presents considerable advantages:

The process for the storing of the identification codes in memory locations that are unambiguously assigned to the various wheel positions—this process is also called memorizing or teach-in process—can be effectuated with a minimum of labor effort when one wheel or several wheels or all the wheels of a vehicle must be mounted, be it for the first mounting or because of the changing of wheels. Since the wheels are not yet in their mounted position but are still freely moveable they can be easily moved into the proximity of the trigger transmitter provided for the teach-in process. After the wheel position was chosen at an evaluation unit electrically connected to a control unit of the tire pressure monitoring device, in which position the wheel is to be mounted, the trigger transmitter can then trigger the tire pressure monitoring device preferably by manually operating the trigger transmitter. Because the wheel was brought to the proximity of the trigger transmitter, the tire pressure monitoring device mounted on the wheel can receive the signal sent by the trigger transmitter by, e.g., the same antenna provided for the tire pressure monitoring device for the emission of its radio signals. However, it is also possible to provide a separate receiving antenna in the tire pressure monitoring device, especially when a trigger transmitter is provided that sends at other frequencies than the transmitter of the tire pressure monitoring device. After the tire pressure monitoring device of the chosen wheel has received the triggering signal it sends its radio signal that contains its identification code. The radio signal is received by the receiver of the vehicle's tire pressure monitoring device or—in case it should be equipped with various receivers—by one of the receivers of the tire pressure monitoring device and it is relayed to the evaluation unit, wherein the identification code contained in the received radio signal is stored in the memory location provided for the chosen wheel position. Thereupon, the chosen wheel is mounted in its predetermined wheel position. The same process applies to the other wheels to be mounted.

Because the wheels to be mounted have to be rolled anyway from a device, on which the tires were mounted on the rim of the wheel, or from a balancing machine to their respective wheel position, the vehicle's trigger transmitter is practically in the path of the wheel so that the teach-in process can be effectuated, so to speak, "en passant."

The additional industrial effort is low: It suffices to install in the vehicle a trigger transmitter with limited range, which does not even have to be connected with the other components of the tire pressure monitoring device.

Should the trigger transmitter be connected with the vehicle at a chosen spot, in contrast to the utilization of a portable trigger transmitter it can be ensured that the range of the trigger transmitter reaches only to the wheel in its proximity but that it does not suffice to cause the tire pressure monitoring devices on wheels already mounted in their wheel position, or on the other wheels still waiting to be mounted, to send radio signals.

The trigger transmitter can be embodied with considerably fewer requirements than the TECMA/Schrader programming unit known in prior art.

Because the teach-in process is effectuated by bringing the wheels one by one to the trigger transmitter which is preferably manually operated, the identification codes of the tire pressure monitoring devices at twin wheels can be memorized without any problems.

The trigger transmitter can be a stationary component of the vehicle.

The trigger transmitter's own battery can supply it with power but preferably it is connected to the vehicle's battery, so that it is operative at any time.

Conventional tire pressure monitoring systems are provided at the dashboard with a control unit for its evaluation unit, at which can be effectuated the selection of each of the wheel positions. However, it is also possible to provide in the proximity of the trigger transmitter a separate input device, connected to the evaluation unit, so that where the activation of the trigger transmitter is effectuated one can also select beforehand the wheel position in which the next wheel is to be mounted.

Whether or not the teach-in process of the identification code of a tire pressure monitoring device was successful can be checked at the control unit of the tire pressure monitoring device, e.g., at a LCD display. It is however more advantageous if the reception of the radio signal caused by the trigger transmitter is acknowledged by the receiver or by the evaluation unit connected to the receiver by sending a special signal that can be perceived by the individual who carries out the teach-in process at the position at which he is with the wheel when he activates the trigger transmitter, namely, in the proximity of the trigger transmitter. The signal can be an optical signal such as, e.g., the flashing of a signal lamp that is installed either at or next to the trigger transmitter, or the flashing of directional signals that are already provided on the vehicle. Preferably, the reception of the radio signals caused by the trigger transmitter is acoustically acknowledged such as, e.g., by means of a beeper that can be assigned to the trigger transmitter.

Preferably, the identification code, contained in the radio signal that is caused by the trigger transmitter provided for the teach-in process of the identification character, is compared in the evaluation unit with the already stored identification codes. Should the received identification code agree with an already stored identification code, its can be assumed that the radio signal was not originated by the tire pressure monitoring device of the chosen wheel, but rather from the tire pressure monitoring device of another wheel. Such an error can occur at activating a tire pressure monitoring device that is within the range of the trigger transmitter at another wheel than the chosen one such as, e.g., at an already mounted wheel in the proximity of the trigger transmitter or at a not yet mounted wheel. In such a case, the teach-in process of the identification code for the chosen wheel must be repeated. An accidental agreement of the identification codes of two tire pressure monitoring devices can be prevented by providing a sufficiently high number of bits for the generation of the identification codes.

Tire pressure monitoring devices can send radio signals not only upon request but also by itself in the case of falling below or exceeding a preset pressure threshold or at preset time intervals. In order to prevent that such radio signals interfere with the teach-in process of an identification code, upon receiving a signal from the trigger transmitter provided for the teach-in process of the identification code, a special identification character is inserted in the thereupon sent radio signal of the tire pressure monitoring device that indicates that the radio signal deals with a response to the reception of such a trigger signal. The evaluation unit can recognize a response to a trigger signal by the special, i.e. separate, identification character and therefore differentiate between signals that were caused by the trigger transmitter and those that were not caused by this trigger transmitter. The identification code of a radio signal that does not present the special identification character, indicating that it deals with a response signal to the reception of a signal by the trigger transmitter, is neither stored in the evaluation unit nor in the control unit. This further development of the invention makes it possible to differentiate between response signals caused by the special trigger transmitter and the signals originating from the wheels that are either mounted on the vehicle or at an adjacent vehicle and are equipped with an independently emitting tire pressure monitoring device.

Preferably, the trigger transmitter is installed in a stationary manner on the vehicle and, in particular, at an appropriate height to be operated. However, it is also possible to attach the trigger transmitter in such a manner that it can be removed from a mounting support into which it can be locked but that it continues to be connected via a cable with the vehicle electrical distribution device. In such a manner, the trigger transmitter can be brought very close to the tire monitoring device of the chosen wheel. The easiest operation, the least time-consuming carrying out of the teach-in process and the most favorable service life would be if the trigger transmitter were mounted in a stationary manner on the vehicle, e.g., behind a protective cover preferably out of a synthetic material that would let the trigger signals pass.

Preferably, the trigger transmitter is located on the front of the vehicle and it is preferred that it sends the triggering signals towards the front. Thus, it can be easily excluded that the trigger transmitter triggers radio signals from other tire pressure monitoring devices than those that are on wheels already mounted on the vehicle. However, to affix the trigger transmitter at the front of the vehicle is not the only possibility. Another possibility is to install it laterally at the vehicle in the middle between the front wheels and the rear wheels and to configure it and to orient it in such manner that it sends laterally in a preferred direction perpendicular to the longitudinal direction of the vehicle. Such a manner can also prevent that the tire pressure monitoring devices at the wheels are activated at wheels that are already mounted on the vehicle.

Preferably, the output power of the trigger transmitter mounted on the vehicle is adjustable so as to be able to independently adapt the output power to the respective conditions of the present vehicle. This enables in particular an optimum adaptation to the extent that the output power suffices to activate the tire pressure monitoring device of a specific wheel rolled to the proximity of the trigger transmitter but not to activate the tire pressure monitoring device at other wheels already mounted on the vehicle.

It is already known to embed a transponder in the tires of a vehicle, in which are stored data of the tire and in which other data can be stored during the life of the tire. In another favorable development of the invention, the trigger transmitter can be configured in such a manner that it can activate also such a transponder, so that the latter sends the therein stored data to a receiver in the vehicle. By means of one and the same teach-in process, in the vehicle can be transmitted not only an identity code of the tire pressure monitoring device but also tire data which are stored and, eventually evaluated and recorded, in a central processing unit provided for such purpose.

Aforesaid advantages of the method according to the invention apply in the same manner to the vehicle, which is equipped with a tire pressure monitoring device configured according to the invention.

The arbitrary operation of the trigger transmitter can be effectuated in different ways. The easiest manner is to configure the trigger transmitter in such a way that it can be manually operated by means, e.g., of a push button. However, it is also possible to automatically activate the trigger transmitter with the help of, e.g. a proximity sensor that is coupled to the trigger sensor and responds to the approaching of a tire. In such a case it is particularly advantageous if the reception of a radio signal either by the receiver or by the evaluation unit of the tire pressure monitoring device is acknowledged by an optical or acoustical signal, which can be perceived by the individual who rolls the wheel past the trigger transmitter. Preferably, the acknowledging signal is sent when the transmitted identification code was successfully stored. Should such a signal fail to appear, the trigger transmitter will be activated anew.

DETAILED DESCRIPTION

Figure 1:
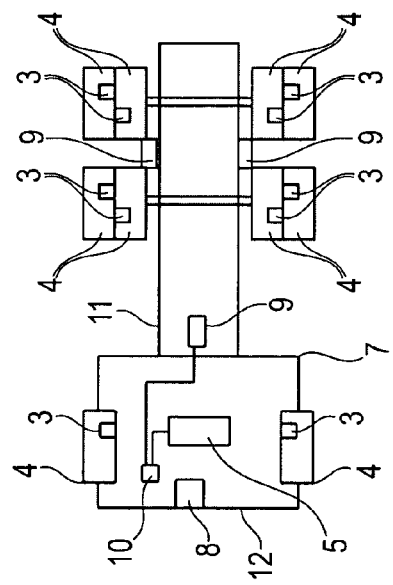
FIG. 1 shows schematically a top view of the chassis and the cab of a commercial vehicle with a tire pressure monitoring device according to the invention and FIG. 2 shows in a diagrammatic view a typical course of the method according to the invention
Figure 2:
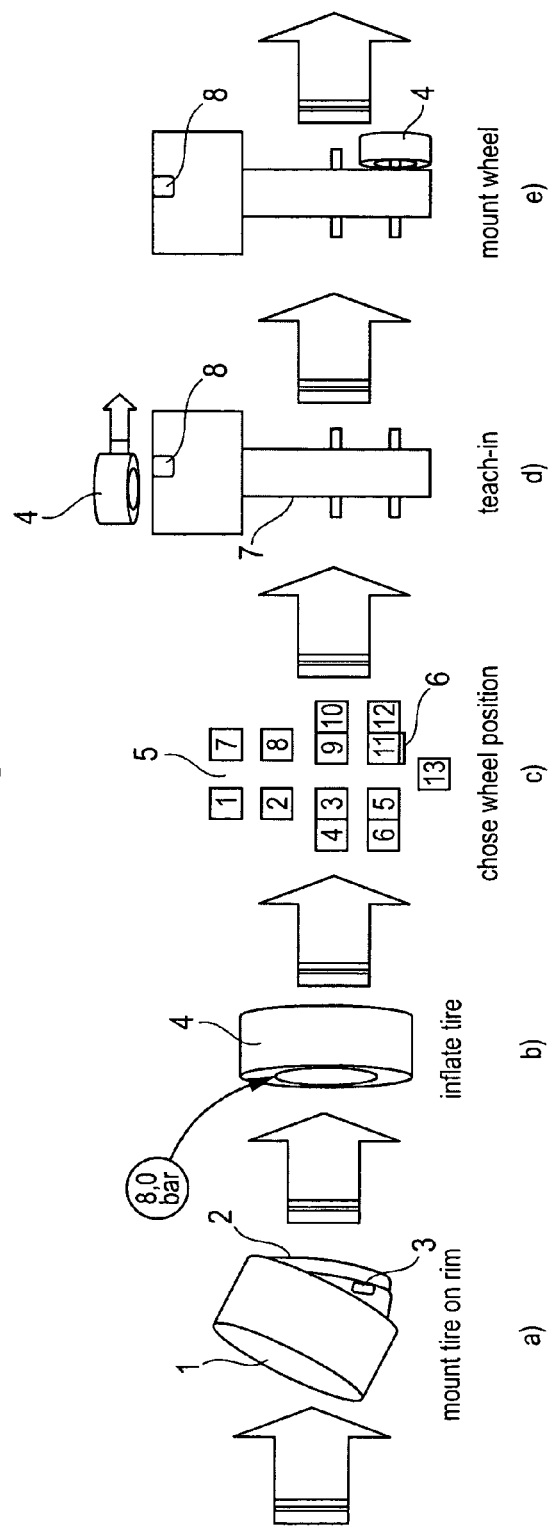

FIG. 1 shows a commercial vehicle 7 with a chassis 11 and a cab 12. The vehicle is a triaxial vehicle. On the front axle are two wheels 4 and on each of the two rear axles are mounted two twin wheels 4. Each wheel 4 is provided on a rim 2 underneath the tire with a tire pressure monitoring device 3 (see FIG. 2) which is either directly mounted on the rim or at the inner stem of a tire valve.

Each tire pressure monitoring device 3 is provided with an electric or electronic pressure sensor, a transmitter with an antenna that preferably can be used either as a sending antenna or as a receiving antenna, or with two antennas—one for the sending of the radio signals and one for the receiving of trigger signals—, an electronic control circuit such as, e.g., a microprocessor or an application-specific integrated circuit (ASIC) as well as a battery that constitutes the autonomous power supply for the tire pressure monitoring device 3. A central receiver 9 provided with a receiving antenna is installed at the chassis 11 behind the cab 12. The receiver can receive radio signals sent by the tire pressure monitoring devices 3. The receiver 9 decodes the received signals and relays them to an evaluation unit 10 that is connected to a control and display unit 5 which is attached at the dashboard of the cab 12. At the front of the cab 12 is provided a trigger transmitter 8 that receives its power from the vehicle battery.

By means of the tire pressure monitoring system illustrated in FIG. 1, the method according to the invention for the teach-in process of the identification signals of the wheels 4, including a spare wheel, can be carried out, e.g., as follows:

A tire pressure monitoring device 3 is affixed to the bed of a rim 2. Then, a tire 1 is mounted on the rim 2 which covers the tire pressure monitoring device 3, see FIG. 2a.

Subsequently, the tire 1 is filled with air until reaching the prescribed pressure at, e.g., an air pressure of 8 bars. If necessary, the wheel will then be balanced, see FIG. 2b. Subsequently, the wheel position is chosen at the control and display unit 5 at which the finished wheel 4 is to be mounted. The control unit shows and consecutively numbers the existing wheel positions. The choice can be effectuated by soft keys 6, by entering the number of the chosen wheel position or by means of a numbered keyboard.

FIG. 2c shows by way of example, and deviating from the illustration in FIG. 1, not only ten but thirteen wheel positions, namely 4 four guided wheels 1, 2, 7, and 8 on two front axles and eight wheels 3 to 6 and 9 to 12, that are combined at four pairs of twin wheels on two rear axles and a spare wheel 13. The result of a choice effectuated at the control unit 5 is that a memory location in the evaluation unit 10, assigned to the chosen wheel positions, is now ready to store for the first time an identification code or to overwrite an identification code already stored in the memory location. For this purpose, the wheel 4 to be mounted is rolled to the front of the cab 12 into the proximity of the there provided trigger transmitter 8 that is manually activated (see FIG. 2d). The trigger transmitter 8 sends a signal that triggers the tire pressure monitoring device 3 in the respective wheel 4, i.e., causes it to emit a radio signal that contains an identification code stored in the electronic control circuit of the tire pressure monitoring device 3. The radio signal is received by the receiver 9, decoded and relayed to the evaluation unit 10, which stores the transmitted identification code in the memory location provided therefore, and acknowledges the successful storage process by means of a preferably acoustic signal. The individual who had rolled the wheel 4 to the trigger transmitter 8 notices the acknowledging signal, knows the successful teach-in of the identification signal and rolls the wheel 4 to the chosen wheel position provided for the wheel 4 in order to mount it there, see FIG. 2e. Thereupon, the next wheel position can be chosen at the control unit 5 and the process can be repeated with another wheel.

Should a tire be provided with a transponder, it can also be activated by the trigger transmitter 8.

REFERENCE NUMBERS LIST

1 Tire
2 Rim
3 Tire Pressure Monitoring Device
4 Wheel
5 Control Unit
6 Softkeys
7 Commercial Vehicle
8 Trigger Transmitter
9 Receiver
10 Evaluation Unit
11 Chassis
12 Cab
13 Spare Wheel

What is claimed is:

1. A method for assigning identification codes that are sent by radio signals by tire pressure monitoring devices disposed at the wheels of a vehicle and received by a receiver provided in or at the vehicle, a first radio signaling being relayed to an evaluation unit connected to the receiver for storing a specific identification code for every wheel position of the vehicle the evaluation unit comparing the stored identification codes with identification codes in subsequently sent first radio signals, whereby for the storage of the identification code of the tire pressure monitoring device of a chosen wheel the specific wheel position intended for the chosen wheel is entered at a control unit, which has a communication link to the evaluation unit, subsequently the tire pressure monitoring device of the chosen wheel is caused to send a first radio signal containing its identification code, this radio signal is received and the therein contained identification code is stored in the evaluation unit or in the control unit at a memory location assigned to the specific wheel position, the first radio signal being sent at preset time intervals or upon tire pressure falling below or exceeding a present pressure threshold, the method comprising:

bringing a chosen wheel, prior to mounting the chosen wheel on a predetermined wheel position, into proximity of a trigger transmitter, the trigger transmitter triggering the tire pressure monitoring device of the chosen wheel for causing the tire pressure monitoring device of the chosen wheel to send a radio signal containing its identification code and also insert into the radio signal a special identifier, separate from its identification code, indicating that the radio signal is a response to the reception of the trigger transmitter.

2. The method according to claim 1, wherein the trigger transmitter is manually operated.

3. The method according to claim 1, wherein the reception of the radio signal caused by the trigger transmitter is acknowledged by the receiver or by the evaluation unit connected to the receiver by sending a signal.

4. The method according to claim 1, wherein the chosen wheel is rolled past the trigger transmitter.

5. The method according to claim 1, wherein the identification code, contained in the radio signal, the sending of which was caused by the trigger transmitter, upon its reception is compared in the evaluation unit with already stored identification codes.

6. The method according to claim 5, wherein the chosen wheel is again brought into position of the trigger transmitter in case that an earlier identification code contained in the radio signal caused by the trigger transmitter agrees with an already stored identification code.

7. The method according to claim 1, wherein the trigger transmitter is affixed to the vehicle in a stationary manner.

8. The method according to claim 1, wherein the triggering signal is sent by the trigger transmitter in such a direction and/or with such intensity that it is unable to activate the tire pressure monitoring device of any of the wheels already mounted on the vehicle.

9. The method according to claim 8, wherein the transponder is embedded in a tire.

10. In a vehicle, a tire pressure monitoring system comprising:

a tire pressure monitoring device provided at each vehicle wheel, the device comprising a pressure sensor and a transmitter for relaying first radio signals, the signals containing information obtained from the measured tire pressure and an identification code characteristic for each tire pressure monitoring device, the first radios signal being sent upon tire pressure falling below or exceeding a present pressure threshold or at preset time intervals;

a receiver, configured for receiving said radio signals and disposed in or at the vehicle, an evaluation unit, connected to the receiver and comprising a memory location for each wheel position of the vehicle;

a comparator for comparing the identification codes contained in a received radio signal with stored identification codes, whereby the stored identification codes can be either changed or overwritten; and a trigger transmitter disposed on the vehicle and configured for sending arbitrary trigger signals for causing the tire pressure monitoring devices to send second radio signals that not only contain the identification code of the tire pressure monitoring device, but also a special identifier, separate from the identification code, indicating that the second radio signal is a response to reception of the trigger transmitter.

11. The system according to claim 10, wherein the trigger transmitter can be manually operated.

12. The system according to claim 11, wherein the trigger transmitter or in its proximity is provided a mechanism for its operation.

13. The system according to claim 10, wherein the trigger transmitter is affixed at a front of the vehicle.

14. The system according to claim 13, wherein the trigger transmitter is configured and arranged for sending triggering signals preponderantly towards the vehicle front.

15. The system according to claim 10, further comprising a control unit for switching an operating status of the evaluation unit in which a memory location for the identification code of a tire pressure monitoring device, installed at a chosen wheel position, is accessible for a change of the memory contents and that each of the existing wheel positions can be individually chosen at the control unit.

16. The system according to claim 10, wherein the output power of the trigger transmitter is adjustable.

17. The system according to claim 16, further comprising a control element for manually varying the trigger transmitter output power.

* * * * *